(12) United States Patent
Bang

(10) Patent No.: US 9,481,980 B2
(45) Date of Patent: Nov. 1, 2016

(54) DEVICE FOR FIXING A LOWER GLASS FOR A CONSTRUCTION MACHINERY CABIN

(75) Inventor: Jang-Hoon Bang, Changwon-si (KR)

(73) Assignee: VOLVO CONSTRUCTION EQUIPMENT AB, Eskilstuna (SE)

(*) Notice: Subject to any disclaimer, the term of this patent is extended or adjusted under 35 U.S.C. 154(b) by 334 days.

(21) Appl. No.: 14/237,274

(22) PCT Filed: Aug. 16, 2011

(86) PCT No.: PCT/KR2011/005995
§ 371 (c)(1),
(2), (4) Date: Feb. 5, 2014

(87) PCT Pub. No.: WO2013/024912
PCT Pub. Date: Feb. 21, 2013

(65) Prior Publication Data
US 2014/0234020 A1 Aug. 21, 2014

(51) Int. Cl.
E02F 9/16 (2006.01)
B60J 1/00 (2006.01)
(Continued)

(52) U.S. Cl.
CPC ............... *E02F 9/16* (2013.01); *B60J 1/006* (2013.01); *B60J 1/085* (2013.01); *B60J 1/12* (2013.01); *B60J 5/0419* (2013.01); *E02F 9/163* (2013.01);
(Continued)

(58) Field of Classification Search
CPC ............... Y10T 403/591; Y10T 403/7005; Y10T 403/7016; E02F 9/16; E02F 9/163; B60J 1/004; B60J 1/005; B60J 1/006; B60J 1/085; B60J 1/12; B60J 5/0419; F16B 21/02; E05B 65/1033

USPC .............. 403/322.1, 348, 354; 52/202
See application file for complete search history.

(56) References Cited

U.S. PATENT DOCUMENTS 3,998,009 A * 12/1976 Niessner ............... B60J 1/2097
49/394
5,067,278 A * 11/1991 Lyons ................... F16L 45/00
292/241

(Continued)

FOREIGN PATENT DOCUMENTS

FR   EP 1072502 A1 *  1/2001 ........... B62D 29/048
JP   0480707 U        7/1992

(Continued)

OTHER PUBLICATIONS

International Search Report mailed Mar. 23, 2012 for PCT/KR2011/005995.

*Primary Examiner* — Ryan Kwiecinski
(74) *Attorney, Agent, or Firm* — Hauptman Ham, LLP

(57) ABSTRACT

An apparatus can detachably fix the lower glass of the cab according to a working environment through simple adjustment of an adjustment knob. The apparatus detachably fixes the lower glass of the cab according to a working environment includes a lower bracket fixedly installed on a lower side of a window frame of the cab and including a rubber member to prevent a secession of the lower glass; a knob support plate including a fixing plate having a guide groove and a position setting hole, and a support plate having a compression pad, wherein the fixing plate is fixedly installed on an upper side of the window frame and the support plate compressively supports one side of an upper portion of the lower glass; and an adjustment knob provided with a projection portion that is fitted into the guide groove to be slidably guided clockwise or counterclockwise.

3 Claims, 2 Drawing Sheets

(51) Int. Cl.
   *B60J 1/08*        (2006.01)
   *B60J 5/04*        (2006.01)
   *F16B 21/02*       (2006.01)
   *E05B 65/10*       (2006.01)
   *B60J 1/12*        (2006.01)

(52) U.S. Cl.
   CPC ........... *E05B 65/1033* (2013.01); *F16B 21/02* (2013.01); *Y10T 403/591* (2015.01); *Y10T 403/7005* (2015.01)

(56) References Cited

U.S. PATENT DOCUMENTS

| | | | | |
|---|---|---|---|---|
| 5,255,479 | A * | 10/1993 | Shepherd | A62B 3/00 49/449 |
| 6,293,059 | B1 * | 9/2001 | Goodwin | E06B 9/02 52/202 |
| 6,334,282 | B1 * | 1/2002 | Wood | E06B 9/02 292/137 |
| 2002/0078642 | A1 * | 6/2002 | Yun | B60J 5/0419 52/208 |
| 2007/0028536 | A1 * | 2/2007 | Pandorf | E06B 9/02 52/203 |
| 2009/0229094 | A1 * | 9/2009 | Reese | B60J 1/006 24/530 |
| 2011/0289850 | A1 * | 12/2011 | Helms | B60J 1/085 49/141 |
| 2014/0292034 | A1 * | 10/2014 | Ueda | E02F 9/16 296/190.08 |

FOREIGN PATENT DOCUMENTS

| | | |
|---|---|---|
| JP | 05010676 U | 2/1993 |
| KR | 0123820 Y1 | 8/1998 |
| KR | 0128517 Y1 | 11/1998 |
| KR | 1020020054022 A | 7/2002 |
| WO | 2009110273 A1 | 9/2009 |

* cited by examiner

DEVICE FOR FIXING A LOWER GLASS FOR A CONSTRUCTION MACHINERY CABIN

CROSS REFERENCE TO RELATED APPLICATION

This application is the National Phase application of International Application No. PCT/KR2011/005995 filed on Aug. 16, 2011, which is incorporated herein by reference in its entirety.

TECHNICAL FIELD

The present invention relates to an apparatus for fixing a lower glass of a cab for a construction machine. More particularly, the present invention relates to an apparatus for fixing a lower glass of a cab for a construction machine, which can detachably fix the lower glass of the cab according to a working environment through simple adjustment of an adjustment knob.

BACKGROUND ART

Generally, in a construction machine including an excavator, a lower glass, which is detachably attached to a lower side of a frame of a cab, may be separated to be fixed to an inner surface of a door or to one side of a ceiling frame of the cab. The lower glass is one of very useful dedicated equipment of the construction machine, which can be used in a detachable manner so as to prevent safety accident due to broken pieces during the operation of the construction machine and to secure operator's visual field with respect to the lower side of the cab.

Typically, an apparatus for fixing a lower glass of a cab for a construction machine in the related art, which is disclosed in Korean Unexamined Patent Publication No. 2002-0054022 (published on Jul. 6, 2002), is well known as a lever operation type, and includes a lower bracket fixed to a lower side of an inner surface of a cab door to prevent a secession of the lower glass and having a rubber material formed thereon to protect the lower glass that is seated in a locking groove from an impact, an upper bracket fixed to an upper side of the inner surface of the door and having a rubber material formed thereon to protect the lower glass from the impact when the lower glass is fixed, and a lock detachably locking the upper side of the lower glass that is seated on the lower bracket onto the inner surface of the door through compressive support of the upper side of the lower glass with respect to the upper bracket.

The apparatus for fixing a lower glass of a cab for a construction machine in the related art as described above, however, has stability through pressing of the lower glass through a lock lever, but its technical configuration is complicated to lower the economical efficiency.

Further, according to the apparatus for fixing a lower glass of a cab for a construction machine in the related art as described above, since it is required to mount the lower glass on a side surface or a rear surface of the cab, an operator's access route is relatively far from the cab door side, and thus operator's working attitude becomes inconvenient to cause disadvantage in ergonomics.

DISCLOSURE

Technical Problem

Therefore, the present invention has been made to solve the above-mentioned problems occurring in the related art, and one embodiment of the present invention is related to an apparatus for fixing a lower glass of a cab for a construction machine, which can stably fix and support the lower glass during detachable adjustment of the lower glass and enable an operator to conveniently perform attachment or detachment of the lower glass using an adjustment knob having a compact structure.

Technical Solution

In accordance with an aspect of the present invention, there is provided an apparatus for fixing a lower glass of a cab for a construction machine that detachably fixes the lower glass of the cab according to a working environment, which includes a lower bracket fixedly installed on a lower side of a window frame of the cab and including a rubber member to prevent a secession of the lower glass; a knob support plate including a fixing plate having a guide groove and a position setting hole, and a support plate having a compression pad, wherein the fixing plate is fixedly installed on an upper side of the window frame and the support plate compressively supports one side of an upper portion of the lower glass; and an adjustment knob provided with a projection portion that is fitted into the guide groove to be slidably guided clockwise or counterclockwise, and rotatably installed on the knob support plate.

The compression pad may be composed of an elastic member that includes rubber or sponge.

The knob support plate may be installed on the side of the window frame, and the adjustment knob may be rotatably installed on the knob support plate so as to be in close contact with one side surface of the lower glass.

Preferably, the window frame may be formed on a lower portion of a door of the cab.

Advantageous Effect

According to the apparatus for fixing a lower glass of a cab for a construction machine according to the present invention, an operator can easily perform attachment/detachment adjustment work of the lower glass as rotating the adjustment knob clockwise or counterclockwise.

Further, according to the apparatus for fixing a lower glass of a cab for a construction machine according to the present invention, since the adjustment knob having a relatively compact structure in comparison to that in the related art is manufactured using an injection process, the manufacturing cost can be reduced, and the economic solution can be achieved.

BRIEF DESCRIPTION OF THE DRAWINGS

The above objects, other features and advantages of the present invention will become more apparent by describing the preferred embodiments thereof with reference to the accompanying drawings, in which.

BEST MODE

Figure 1:
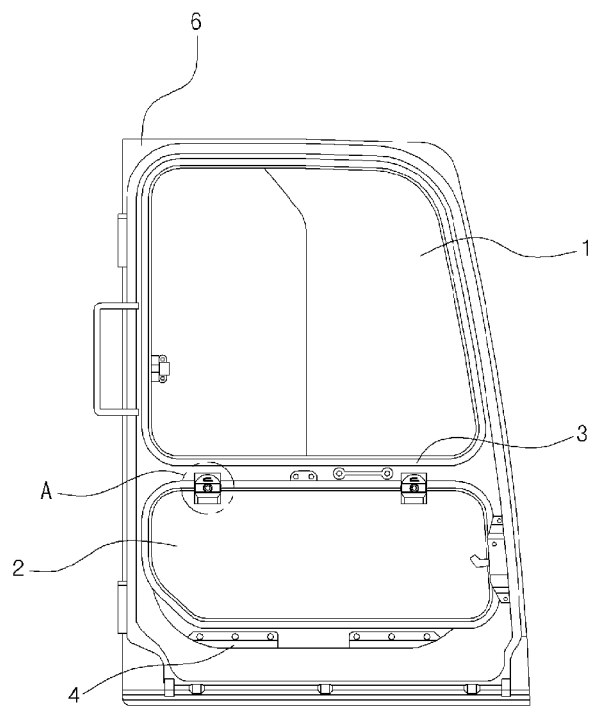
FIG. 1 is a schematic view illustrating a lower glass fixing state of an apparatus for fixing a lower glass of a cab for a construction machine according to an embodiment of the present invention.

Hereinafter, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In the drawing, the reference numeral 1 denotes an upper glass, 2 denotes a lower glass, 3 denotes a window frame, 6 denotes a cab, 9 denotes a compression pad, and 10 denotes a fixing plate of a knob support plate. Further, the reference numeral 11 denotes a support plate of the knob support plate, 12 denotes a spacer, 13 denotes a main body of a knob, 14 denotes a handle of the knob, 18 denotes a mounting hole flange, and 22 denotes a step height portion of the knob.

Figure 2:
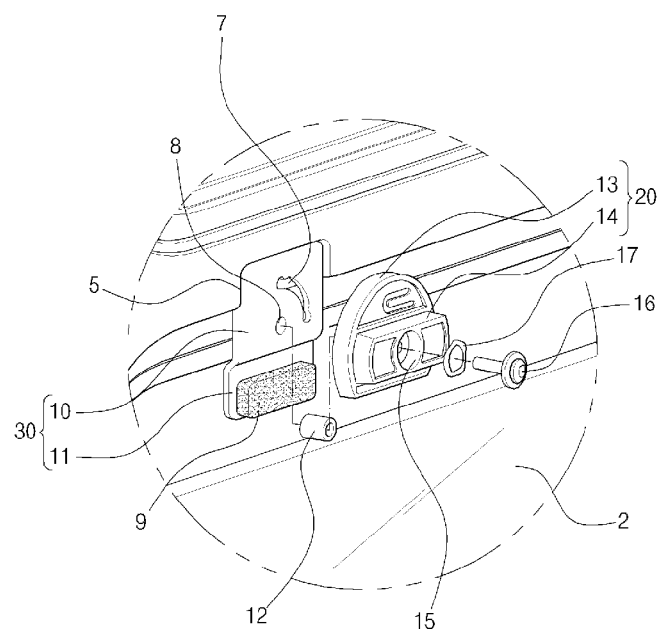
FIG. 2 is an enlarged exploded perspective view of a region indicated at 'A' in FIG. 1, for explaining an installation state of an adjustment knob according to an embodiment of the present invention.

As illustrated in FIGS. 1 and 2, an apparatus for fixing a lower glass of a cab for a construction machine according to an embodiment of the present invention may be installed on a window frame formed on a frame of a cab to fixedly support the lower glass.

Preferably, an apparatus for fixing a lower glass of a cab for a construction machine that detachably fixes the lower glass 2 of the cab 6 according to a working environment includes a lower bracket 4 fixedly installed on a lower side of a window frame 3 of the cab 6 and including a rubber member to prevent a secession of the lower glass 2; a knob support plate 30 including a fixing plate 10 having a guide groove 7 and a position setting hole 8, and a support plate 11 having a compression pad 9, wherein the fixing plate 10 is fixedly installed on an upper side of the window frame 3 and the support plate 11 compressively supports one side of an upper portion of the lower glass 2; and an adjustment knob 20 provided with a projection portion 19 that is fitted into the guide groove 7 to be slidably guided clockwise or counterclockwise, and rotatably installed on the knob support plate 30.

The adjustment knob 20 includes a handle 14 projecting to an upper portion of the main body 13 thereof and a step height support portion 22 extending on the side of the main body 13 thereof.

It is preferable that the adjustment knob 20 is made of plastic that can be manufactured in an injection process as a whole. However, according to the specifications of the equipment, the adjustment knob 20 may be manufactured in the ejection process using a rubber material or other steel materials.

Figure 3:
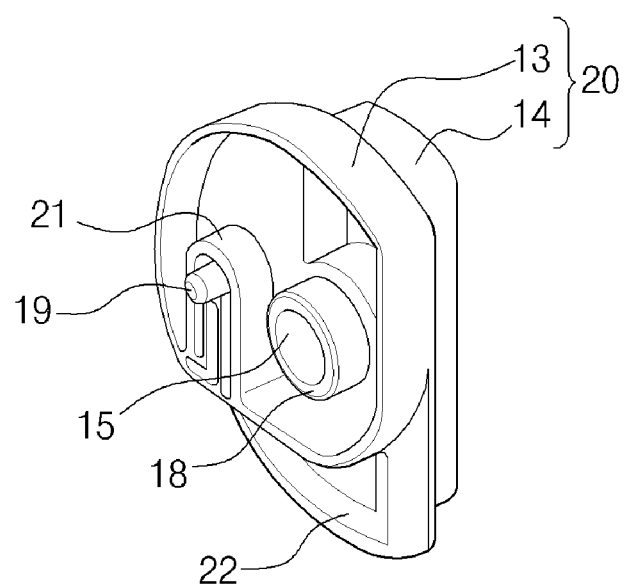
FIG. 3 is a perspective view illustrating a rear side of an adjustment knob according to an embodiment of the present invention.

Referring to FIGS. 1 to 3, according to the apparatus for fixing a lower glass of a cab for a construction machine according to an embodiment of the present invention, the window frame 3 is provided with a mount portion 5.

The mount portion 5 may be formed in a grooved structure on one side of the window frame 3 to support the fixing plate 10 of the knob support plate 30, and a plurality of mount portions 5 may be arranged on upper and lower portions or side portions of the window frame 3 in consideration of a load of the lower glass 2.

The compression pad 9 may be composed of an elastic member including rubber or sponge to appropriately absorb vibration or impact of the lower glass 2.

The adjustment knob 20 is rotatably installed on the fixing plate 10 of the knob support plate 30 through a fixing member 16, and the fixing member 16 is fastened through a mount hole 15 that penetrates the handle 14 and the main body 13. Further, the projection portion 19 is formed to project from one side of the bottom surface of the main body 13 of the adjustment knob 20, and preferably is formed adjacent to the flange 21.

In an assembling process, the projection portion 19 of the adjustment knob 20 is inserted into the guide groove 7 as shown in FIG. 2, and thus the adjustment knob 20 is entirely rotatable clockwise about the fixing member 16 that is fastened to the position adjustment hole 8.

In an embodiment of the present invention, on the lower portion of the main body of the adjustment knob 20, a spacer 12 for adjusting a gap between an upper surface of the knob support plate 30 and a bottom surface of the main body 13 may be installed in consideration of the thickness of the lower glass 2 during assembling.

In this case, the fixing member 16 may be inserted in the length direction of the spacer 12, and the adjustment knob 20 can be rotatably fixed onto the knob support plate 30 through the spacer 12 by the fixing member 16.

Although not illustrated, the adjustment knob 20 may change the position of the guide groove 7 and the projection portion 19 so that the adjustment knob 20 is rotatable counterclockwise about the fixing member that is fastened to the position adjustment hole 8.

The guide groove 7 forms an elongated hole in a circular arc shape, and a locking groove for interrupting sliding movement of the projection portion 19 may be provided at the vertical end portion of the elongated hole.

In an embodiment of the present invention, it is preferable that the window frame 3 is provided on the lower portion of the cab door.

On the other hand, the knob support plate 30 may be installed on the side of the window frame 3, and the adjustment knob 20 may be rotatably installed on the knob support plate 30 so as to come in close contact with one side surface of the lower glass 2.

In this case, in order to facilitate the attachment/detachment of the lower glass 2, a plurality of adjustment knobs 20 and knob support plates 30 may be provided. In the preferred embodiment of the present invention as described above (in which the adjustment knob 20 and the knob support plate 30 are provided on the upper side of the window frame 3), the adjustment knobs 20 and the knob support plates 30 may be provided on the upper sides of a plurality of window frames 3.

Although preferred embodiments of the present invention have been described for illustrative purposes, the present invention is not limited to the above-described specific embodiments, and those of ordinary skill in the art to which the present invention pertains will appreciate various changed in form and detail may be made therein without departing from the spirit and scope of the invention as defined by the appended claims. Further, the items that can be easily analogized from the accompanying drawings, although not described in the detailed description, should be considered to be included in the contents of the present invention, and various modified embodiments should not be understood separately from the technical idea or prospect of the present invention.

INDUSTRIAL APPLICABILITY

According to the apparatus for fixing a lower glass of a cab for a construction machine according to the present invention, an operator can easily perform attachment/detachment adjustment work of the lower glass as rotating the adjustment knob 20 clockwise or counterclockwise.

For example, if an operator or a user holds and rotates the handle 14 of the adjustment knob 20 for attachment of the lower glass 2, the compression pad 9 supports the outer surface of the lower glass 2, and the bottom surface of the step height support portion 22 comes in contact with and supports the inner surface of the lower glass 2.

Further, according to the apparatus for fixing a lower glass of a cab for a construction machine according to the present invention, since elements, such as lock lever and the like, are unnecessary and thus the apparatus has a relatively compact structure in comparison to that in the related art, the operation can be conveniently performed, and thus the manufacturing cost and the work effort can be reduced.

The invention claimed is:

1. An apparatus for detachably fixing a glass on a window frame of a cab for a construction machine according to a working environment, the apparatus comprising:
   a lower bracket fixedly installed on a lower side of the window frame;
   a knob support plate including
      a fixing plate having a guide groove and a position setting hole, and
      a support plate extended from the fixing plate and having a compression pad,
   wherein the fixing plate is coupled to an upper side of the window frame and the support plate compressively supports one side of an upper portion of the glass;
   an adjustment knob having a projection portion and rotatably coupled to the fixing plate, wherein the projection portion is fitted into the guide groove to slidably guide a rotation of the adjustment knob on the fixing plate;
   a spacer inserted between the fixing plate and the adjustment knob, and configured to provide a predetermined gap between the fixing plate and the adjustment knob; and
   a fixing member extending through the adjustment knob and the spacer, and coupled to the position setting hole to rotatably couple the adjustment knob to the fixing plate.

2. The apparatus according to claim 1, wherein the compression pad is an elastic member.

3. The apparatus according to claim 1, wherein the window frame is formed on a lower portion of a door of the cab.

* * * * *